US005854582A

United States Patent [19]

Clark et al.

[11] Patent Number: 5,854,582

[45] Date of Patent: Dec. 29, 1998

[54] PIVOTAL LATCHING MECHANISM WITH INTERENGAGEABLE LATCH ARM AND CATCH IN A SECTIONALIZER ASSEMBLY

[75] Inventors: Daren A. Clark; Marc S. Bacon, both of Centralia, Mo.

[73] Assignee: Hubbell Incorporated, Orange, Conn.

[21] Appl. No.: 921,928

[22] Filed: Aug. 27, 1997

[51] Int. Cl.[6] .......................... H01H 71/10; H01H 83/00; H01H 73/02; H02H 7/26

[52] U.S. Cl. .......................... 337/169; 337/141; 337/175; 337/12; 335/32; 361/102; 361/115

[58] Field of Search .......................... 337/12, 168, 169, 337/170, 171, 172, 173, 174, 175, 176, 177, 178, 179; 335/26–34; 361/102, 115

[56] References Cited

U.S. PATENT DOCUMENTS

| | | | |
|---|---|---|---|
| 1,954,849 | 4/1934 | Seese | 175/294 |
| 1,982,986 | 12/1934 | Garlington | 200/89 |
| 2,053,445 | 9/1936 | Trose | 175/294 |
| 3,418,529 | 12/1968 | Attewell | 317/11 |
| 3,818,275 | 6/1974 | Shimp | 317/33 |
| 4,540,968 | 9/1985 | Kato et al. | 337/31 |
| 4,553,188 | 11/1985 | Aubrey et al. | 361/115 |
| 4,768,010 | 8/1988 | Brown et al. | 337/169 |
| 4,795,996 | 1/1989 | Brown et al. | 337/169 |
| 4,797,777 | 1/1989 | Beard | 361/115 |
| 4,935,715 | 6/1990 | Popek | 337/169 |
| 5,162,967 | 11/1992 | Ojangurin | 361/115 |
| 5,172,090 | 12/1992 | Ranjan et al. | 337/169 |
| 5,463,366 | 10/1995 | Hassler et al. | 337/176 |
| 5,559,488 | 9/1996 | Hassler et al. | 337/158 |
| 5,612,661 | 3/1997 | Twenter et al. | 337/169 |

FOREIGN PATENT DOCUMENTS

| | | |
|---|---|---|
| 667078 | 2/1952 | United Kingdom . |
| 1076773 | 7/1967 | United Kingdom . |
| 1109320 | 4/1968 | United Kingdom . |

*Primary Examiner*—Leo P. Picard
*Assistant Examiner*—Anatoly Vortman
*Attorney, Agent, or Firm*—Jerry M. Presson; Michael R. Swartz

[57] ABSTRACT

A sectionalizer assembly includes a mounting structure having upper and lower electrical contacts, a sectionalizer tube, an actuating member mounted to the tube and movable from a non-actuated to an actuated position, and a pivotal latching mechanism having a pivot member, latch arm and catch. The pivot member is mounted to the lower electrical contact and to a lower end of the tube for undergoing pivotal movement relative thereto between locking and releasing positions. The latch arm fixedly attached to the pivot member extends outwardly therefrom and undergoes pivotal movement therewith between the locking and releasing positions. The catch is carried on a lower end of the actuating member and undergoes movement therewith. The latch arm has an outer end fittable within a recess in the catch that is open at least at one side thereof. The latch arm outer end interengages the catch within the recess thereof when the actuating member is at the non-actuated position and the pivot member is at the locking position. Such interengagement tends to maintain the pivot member in the locking position. The latch arm outer end disengages the catch recess as the actuating member is moved from the non-actuated position to the actuated position and the pivot member is moved from the locking position to the releasing position. The movement of the catch with the actuating member from the non-actuated position to the actuated position causes the latch arm to pivotally move away from and disengage the catch, permitting an upper end of the tube to move from a closed to open position relative to the upper electrical contact.

9 Claims, 5 Drawing Sheets

PIVOTAL LATCHING MECHANISM WITH INTERENGAGEABLE LATCH ARM AND CATCH IN A SECTIONALIZER ASSEMBLY

BACKGROUND OF THE INVENTION

1. Field of the Invention

The present invention generally relates to an electronic sectionalizer and, more particularly, is concerned with a sectionalizer assembly employing a pivotal latching mechanism having a latch arm and catch releasably interengageable with one another for releasably holding the pivotal latching mechanism in a locking position relative to an electronic sectionalizer tube of the sectionalizer assembly.

2. Description of the Prior Art

High voltage power distribution systems are typically comprised of a main supply line that is connected to a number of branch or lateral lines. Normally, the main line is protected near its source of power by an automatic recloser or a reclosing circuit breaker which is operable to disable the entire system downstream of the recloser if currents above a certain magnitude are detected. Automatic reclosers and reclosing circuit breakers are particularly useful for enabling transient fault currents to clear after which time the recloser can again energize the circuit. However, if fault current conditions remain, the recloser after one or more attempts to re-energize the circuit will cease operation and cause the distribution system to remain in a deactivated state until attended by a repairman.

As a result of these operational problems, electronic sectionalizers were developed which count the number of times that the recloser opens and closes the circuit. After a specified number of current flow periods or "shots," the electronic sectionalizer disables the lateral line during a subsequent dead interval when the reclosing apparatus has opened if over-current conditions in the lateral line protected by the sectionalizer are detected. For additional disclosure of electronic sectionalizers, reference is hereby made to U.S. Pat. Nos. 4,768,010 and 4,795,996 to Brown et al., U.S. Pat. No. 4,935,715 to Popeck, and U.S. Pat. No. 5,612,661 to Twenter et al., all of which are assigned to the assignee of the present invention.

Typically, as disclosed in these patents, the electronic sectionalizer is carried by an insulated mounting structure secured to a utility pole or the like. The mounting structure supports an upper electrical contact and a lower electrical contact spaced from the upper contact. The lower electrical contact includes a pair of spaced, hook-shaped portions on which the electronic sectionalizer is carried.

The electronic sectionalizer typically includes a tube assembly, a pivotal latching mechanism and an actuating mechanism. The tube assembly is an elongated electrically conductive structure having an upper terminus and a lower terminus. The upper terminus of the tube assembly is releasably received by the upper electrical contact of the mounting structure when the tube assembly is positioned in a current-conducting closed position. The pivotal latching mechanism is provided between the lower terminus of the tube assembly and the lower electrical contact of the mounting structure for holding the tube assembly in the closed position when the pivotal latching mechanism is at a locking position relative to the tube assembly. The actuating mechanism is mounted within the tube assembly and is operable to actuate the pivotal latching mechanism from the locking position to a releasing position for releasing the tube assembly from engagement with the upper electrical contact and enabling the tube assembly to move from the current-conducting closed position to a circuit-breaking open position. For instance, the actuating mechanism of the cited Twenter et al. patent has an elongated actuating member with a lower end that, upon actuation of the actuating mechanism, moves and engages a lever arm of the pivotal latching mechanism causing the lever arm and pivotal latching mechanism to pivot relative to the lower electrical contact and to the tube assembly from the locking position to the releasing position which causes the tube assembly to movably shift downwardly and away from the upper electrical contact so as to break electrical contact therewith.

The pivotal latching mechanism of the above-cited patents also includes a trunnion member rigidly connected to the lever arm and pivotally mounted between the hook-shaped portions of the lower electrical contact while at the same time also being pivotally coupled to the lower terminus of the tube assembly which enables swinging motion of the trunnion member between the locking and releasing positions relative to the tube assembly during simultaneous swinging movement of the trunnion member relative to the hook portions. The pivotal latching mechanism further includes a spring contact secured to the lower terminus of the tube assembly which normally engages a raised portion of the trunnion member when the tube assembly is in the current-carrying closed position for facilitating the flow of current from the upper electrical contact along the length of the tube assembly and therefrom across the trunnion member to the lower electrical contact. The latching mechanism still further includes a leaf spring latch that normally retains the trunnion member in the locking position relative to the tube assembly with the end of the lever arm underlying and adjacent to the lower end of the elongated actuating member. One end of the leaf spring latch is secured to the undersurface of the trunnion member whereas the other end of the leaf spring latch presents a raised shoulder that is releasably engageable with a conforming cavity provided on the undersurface of the lower terminus of the tube assembly.

Once the actuating mechanism has actuated and pivotally moved the pivotal latching mechanism to the releasing position and the tube assembly of the sectionalizer has assumed the open position, a repairman removes the sectionalizer from the mounting structure while standing on the ground by using a long tool to reach the sectionalizer and lift it from the pair of hook-shaped portions of the lower electrical contact on which it is normally carried. The actuating mechanism of the sectionalizer while on the ground is reset by the repairman pivotally moving the trunnion member of the pivotal latching mechanism from the releasing position to the locking position relative to the tube assembly. In the locking position of the pivotal latching mechanism, the leaf spring latch mounted on the trunnion member re-engages with the lower terminus of the tube assembly for precluding reverse pivotal movement of the pivotal latching mechanism to the releasing position relative to the tube assembly when the repairman resets or reinstalls the sectionalizer to its current-carrying closed position with the lower and upper contacts on the insulated mounting structure. To reset or reinstall the sectionalizer, the repairman uses the same long tool to engage its upper end with the trunnion member and then lift the sectionalizer up to the mounting structure, placing the trunnion member between the hook-shaped portions of the lower electrical contact with the trunnion member supported on the respective hook portions. The repairman then removes the upper end of the long tool from the trunnion member and engages the upper end of the long tool with the upper terminus of the tube assembly. The repairman then moves the long tool so as to pivot the tube assembly (and the trunnion member therewith) relative to the lower electrical contact until the upper terminus of the tube assembly is snapped into engagement with the upper electrical contact of the mounting structure.

A problem has been experienced in carrying out the above-described resetting procedure. During such resetting or reinstalling of the sectionalizer on the mounting structure the leaf spring latch of the pivotal latching mechanism sometimes fails to hold the pivotal latching mechanism in the locking position relative to the tube assembly. More particularly, during pivoting of the tube assembly by the repairman using the long pole, the leaf spring latch has the tendency to disengaged from the shoulder on the lower terminus of the tube assembly which results in the tube assembly failing to be received by and reset with the upper electrical contact at the current-carrying closed position thereby preventing the resumption of current flow from the upper electrical contact along the length of the tube assembly and across the trunnion member to the lower electrical contact. As a result of this failure by the leaf spring latch, additional time and effort must be expended by the repairman in removing the sectionalizer from the mounting structure, moving the trunnion member relative to the tube assembly to place the pivotal latching mechanism at the locking position, and then replacing the sectionalizer back on the mounting structure in order to again attempt to achieve the resetting of the tube assembly to the closed position relative to the upper electrical contact.

Consequently, a need exists for a pivotal latching mechanism designed to overcome the aforementioned problem in the prior art without introducing any new problem in its place.

SUMMARY OF THE INVENTION

The present invention provides a pivotal latching mechanism designed to satisfy the aforementioned need by avoiding the drawbacks of the prior art. The pivotal latching mechanism of the present invention employs a latch arm and catch releasably interengageable with one another which provide a solution to the above-mentioned problem that is simple in construction and utilizes a minimal number of parts, thereby avoiding undue complexity and enhancing reliability of operation. The pivotal latching mechanism eliminates the need for a repairman to expend valuable time and effort having to repeat the installation steps necessary to achieve successful resetting of the electronic sectionalizer.

Accordingly, the present invention is directed to a sectionalizer assembly which comprises: (a) a mounting structure having spaced apart upper and lower electrical contacts; (b) a sectionalizer tube means having spaced apart upper and lower ends; (c) an actuating member mounted to the sectionalizer tube means and having a lower end movable from a non-actuated position to an actuated position relative to the lower end of said sectionalizer tube means; and (d) a pivotal latching mechanism disposed between the lower electrical contact and the lower end of the sectionalizer tube means. The pivotal latching mechanism includes (i) a pivot member mounted to the lower electrical contact and to the lower end of the sectionalizer tube means for undergoing pivotal movement relative thereto between latching and releasing positions, (ii) a latch arm attached to the pivot member and extending outwardly therefrom for undergoing pivotal movement therewith between the latching and releasing positions, the latch arm having an outer end, and (iii) a catch carried on the lower end of the actuating member for undergoing movement therewith, the catch having a recess open at least at one side of the catch, the outer end of the latch arm being releasably fittable with the catch within the recess thereof. The outer end of the latch arm interengages the catch within the recess thereof and thereby maintains the pivot member in the latching position when the actuating member is at the non-actuated position and the pivot member is at the latching position. The outer end of the latch arm disengages the recess of the catch as the actuating member is moved from the non-actuated position to the actuated position and the pivot member is thereby moved from the latching position to the releasing position. The movement of the catch with the actuating member from the non-actuated position to the actuated position causes the latch arm and the pivot member therewith to be pivotally moved away from and disengage the catch, thereby permitting the upper end of the sectionalizer tube means to move from a closed position to an open position relative to the upper electrical contact.

More particularly, the outer end of the latch arm on the pivot member preferably, but not necessarily, has a bifurcated configuration. The catch is in the form of a body having spaced apart upper and lower end portions, an aperture defined in the upper end portion fitting the catch to the end of the actuating member, and the recess defined in at least one side portion of the body extending between the upper and lower end portions thereof. In a preferred embodiment, the body is substantially symmetrical about a central axis of the body that is coincident with a longitudinal axis of the actuating member and the recess is an annular groove formed in a circumferential sidewall of the body and extending symmetrically about the central and longitudinal axes such that the outer end of the latch arm will interengage with the annular groove at any rotational position of the catch and actuating member about the longitudinal axis. In an alternative embodiment, the recess is formed in only one side portion of the body in an asymmetrical relationship to the longitudinal axis of the actuating member such that the recess must be correctly aligned with the outer end of the latch arm before interengaging the latch arm with the catch. In the alternative embodiment of the catch, the recess intersects the longitudinal axis of the actuating member whereas in the preferred embodiment of the catch the annular groove surrounds but does not intersect the longitudinal axis of the actuating member.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 2:
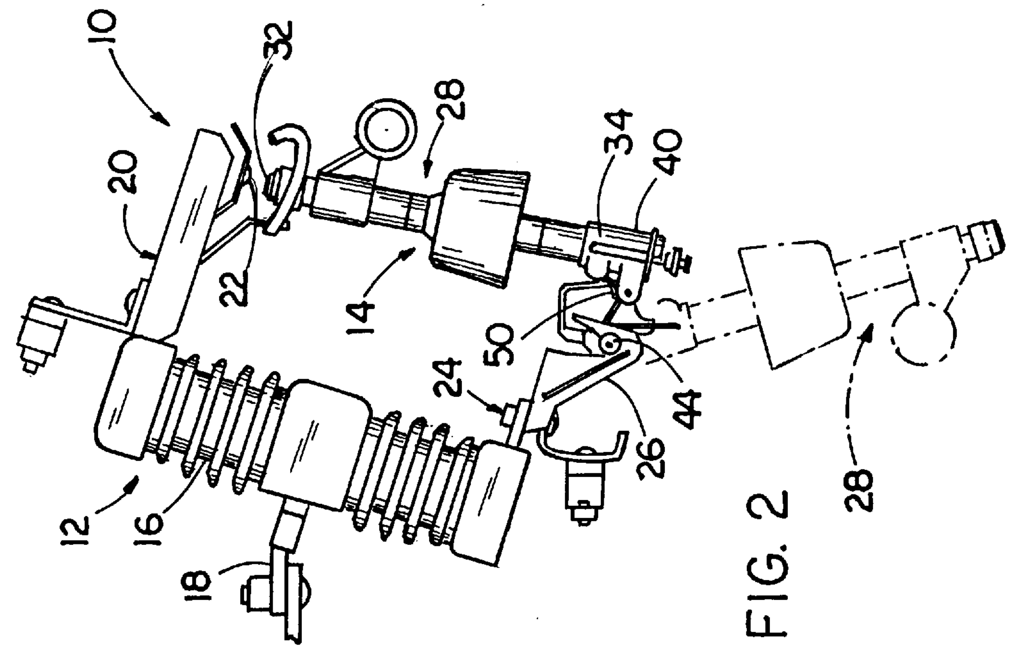
FIG. 2 is a view similar to that of FIG. I except showing the pivotal latching mechanism in a releasing position with the sectionalizer tube means in an open position.

In the following description, like reference characters designate like or corresponding parts throughout the several views. Also in the following description, it is to be understood that such terms as "top", "bottom", "upper", "lower", "right", "left" and the like, are words of convenience and are not to be construed as limiting terms.

Referring to the drawings and particularly to FIGS. 1 to 4, there is illustrated a sectionalizer assembly, being generally designated 10, incorporating the present invention as will be described later below. The sectionalizer assembly 10 basically includes a mounting structure 12 and an electronic sectionalizer 14. The mounting structure 12 of the assembly 10 basically includes an insulator 16 and an arm 18 attached thereto for securing the mounting structure 12 to a utility pole or the like. The mounting structure 12 also includes an upper electrical contact 20 that has a conductive, downward biased arm 22 with a concave detent, and a lower electrical contact 24 spaced from the upper electrical contact 20 and mounted on an opposite end region of the insulator 16. The lower electrical contact 24 has a pair of spaced, hook-shaped portions 26 (only one shown) on which is carried the electronic sectionalizer 14.

The electronic sectionalizer 14 of the assembly 10 basically includes a sectionalizer tube means 28 and a resettable actuating mechanism 30 mounted in the sectionalizer tube means 28. The sectionalizer tube means 28 of the electronic sectionalizer 14 is an elongated electrically conductive, substantially, hollow structure having an upper terminus or end 32 and a lower terminus or end 34 spaced from the upper end 32. The upper end 32 of the sectionalizer tube means 28 is received in the concave detent of the downward biased arm 22 of the upper electrical contact 20. As will become clear later on, the sectionalizer tube means 28 is movable between a current-carrying closed position, shown in FIG. 1, and a drop-out open position, shown in FIG. 2.

The sectionalizer tube means 28 and resettable actuating mechanism 30 of the electronic sectionalizer 14 can take any suitable form such as, by way of example, those of the above-cited Twenter et al. patent the disclosure of which is incorporated herein by reference thereto. As described in the Twenter et al. patent, the actuating mechanism 30 is mounted within the sectionalizer tube means 28 and operable to initiate release of the sectionalizer tube means 28 from electrical and physical engagement with the upper electrical contact 20 so as to permit the sectionalizer tube means 28 to move from the closed position to the open position. More particularly, the actuating mechanism 30 includes an elongated rod-like actuating member 36 mounted for axial movement along its longitudinal axis L within the sectionalizer tube means 28, and suitable conventionally-known control means (not shown) disposed in the sectionalizer tube means 28 and coupled to the actuating member 36. The control means is operable in a known manner to initiate release of the sectionalizer tube means 28 by causing movement of the actuating member 36 from an inner non-actuated position, best seen in FIG. 15, wherein a lower end 36A of the elongated actuating member 36 is located adjacent to the lower end 34 of the sectionalizer tube means 28, to an outer actuated position, best seen in FIG. 16, wherein the lower end 36A of the elongated actuating member 36 is located a short distance outwardly away from the lower end 34 of the sectionalizer tube means 28.

Figure 1:
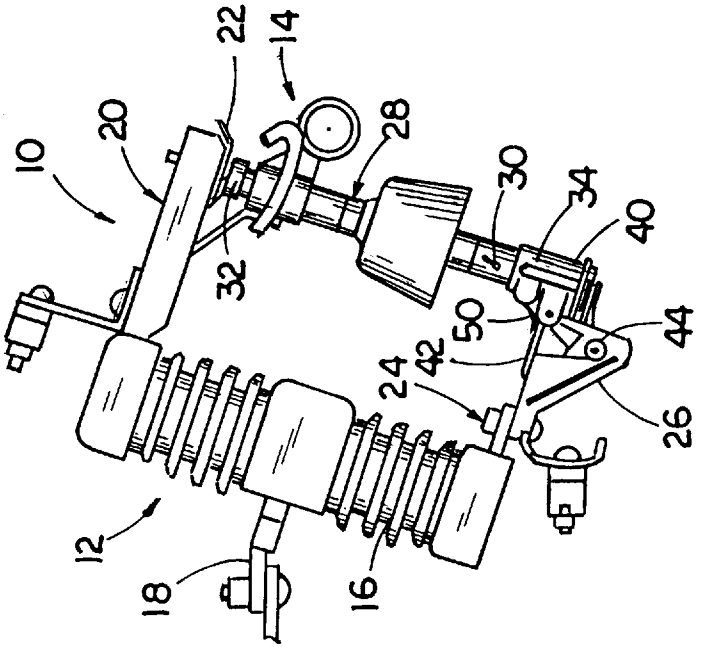
FIG. 1 is a side elevational view of a sectionalizer assembly incorporating a pivotal latching mechanism of the present invention, the pivotal latching mechanism being shown in a locking position with a sectionalizer tube means of the assembly in a closed position.
Figure 3:
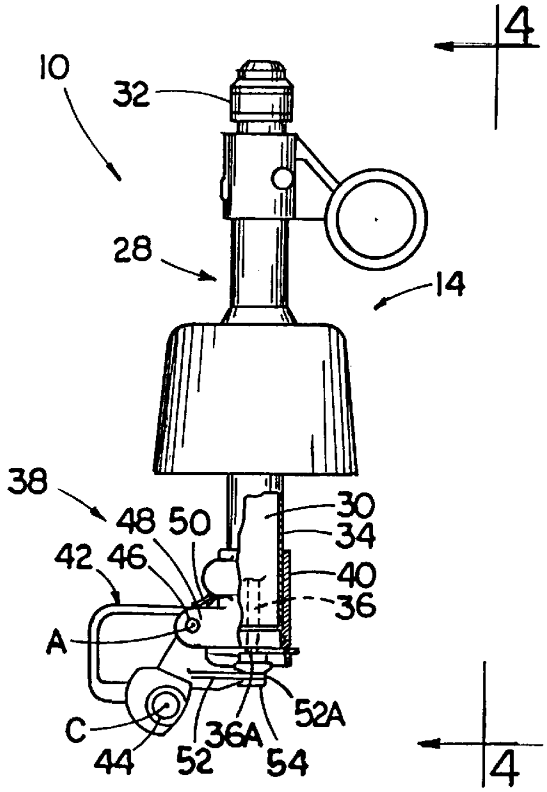
FIG. 3 is an enlarged side elevational view of the pivotal latching mechanism and sectionalizer tube means of the assembly of FIG. 1.
Figure 4:
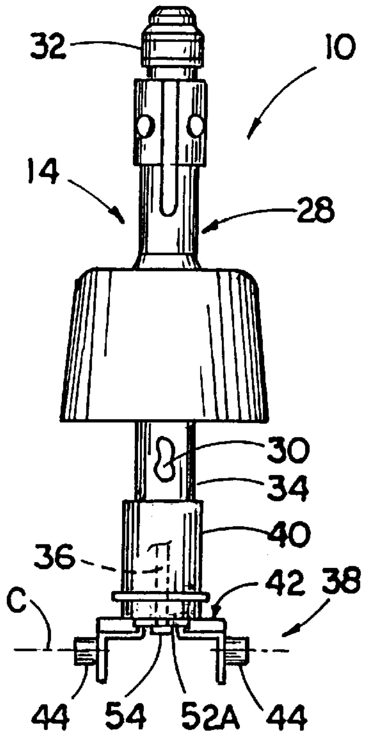
FIG. 4 is a front elevational view of the pivotal latching mechanism and sectionalizer tube means as seen along line 4—4 in FIG. 3.
Figure 13:
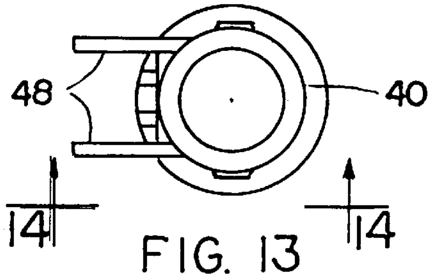
FIG. 13 is a top plan view of a lower coupler of the sectionalizer tube as seen along line 13—13 in FIG. 14.
Figure 11:
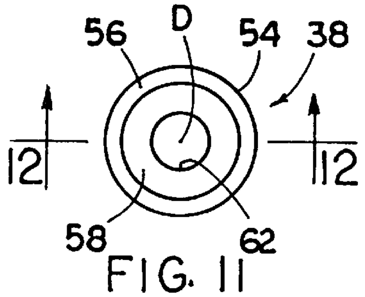
FIG. 11 is a top plan view of the catch as seen along line 11—11 in FIG. 10.
Figure 10:
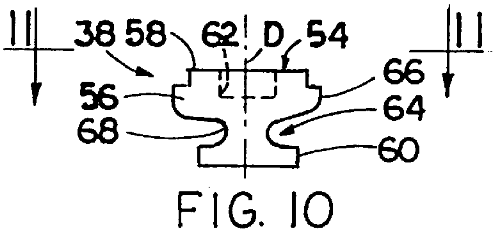
FIG. 10 is an enlarged side elevational view of a first embodiment of a catch of the pivotal latching mechanism of FIG. 3.
Figure 14:
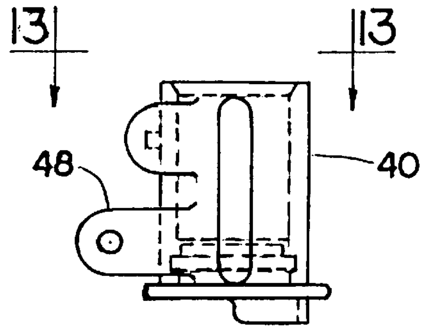
FIG. 14 is a side elevational view of the lower coupler as seen along line 14—14 in FIG. 13.
Figure 12:
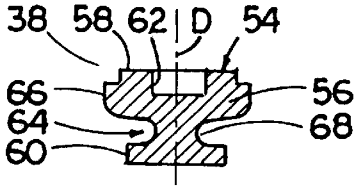
FIG. 12 is a longitudinal sectional view of the catch taken along line 12—12 in FIG. 11.
Figure 7:
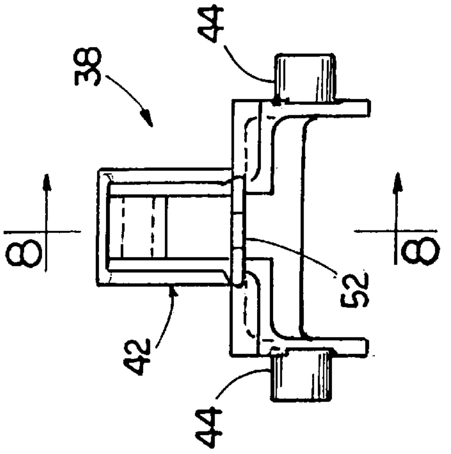
FIG. 7 is a front elevational view of the trunnion member and latch arm as seen along line 7—7 in FIG. 5.
Figure 6:
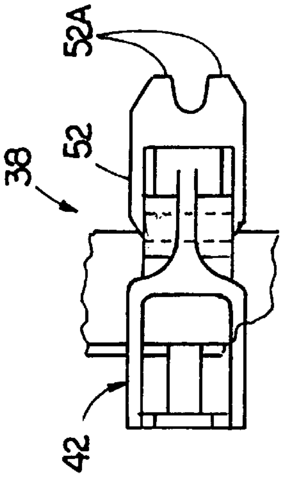
FIG. 6 is a top plan view of the trunnion member and latch arm as seen along line 6—6 in FIG. 5.
Figure 5:
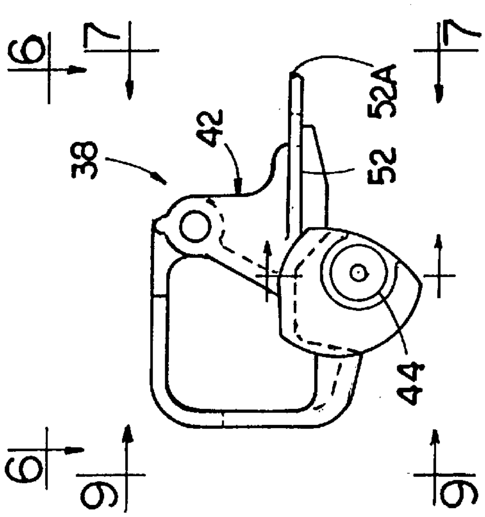
FIG. 5 is an enlarged side elevational view of a pivot or trunnion member and latch arm of the pivotal latching mechanism of FIG. 3.
Figure 8:
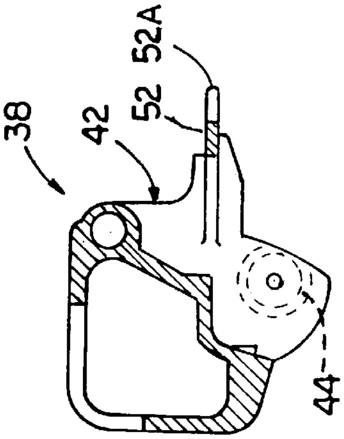
FIG. 8 is a longitudinal sectional view of the trunnion member and latch arm taken along line 8—8 in FIG. 7.
Figure 9:
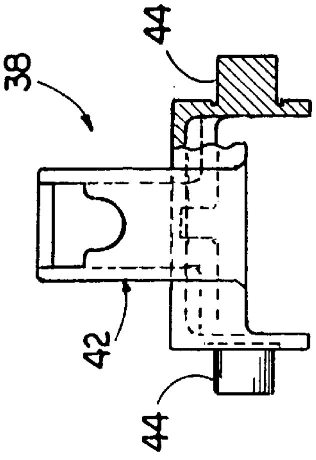
FIG. 9 is a rear elevational view of the trunnion member and latch arm as seen along line 9—9 in FIG. 5.

Referring to FIGS. 1 to 16, the electronic sectionalizer 14 of the assembly 10 also includes a pivotal latching mechanism 38 of the present invention provided between the lower end 34 of the sectionalizer tube means 28 and the lower electrical contact 24 of the mounting structure 12 for holding the sectionalizer tube means 28 in engagement with the upper electrical contact 20 and releasing the sectionalizer tube means 28 therefrom so as to permit the sectionalizer tube means 28 to move from the closed position of FIG. 1 to the open position of FIG. 2. More particularly, the pivotal latching mechanism 38 is pivotally connected to a lower coupler 40 on the lower end 34 of the sectionalizer tube means 28 and also is pivotally supported between and by the spaced hook-shaped portions 26 of the lower electrical contact 24 on the mounting structure 12. The pivotal latching mechanism 38 is operable to move between a latching position, shown in FIGS. 1, 3 and 4, and a releasing position, shown in FIG. 2, to correspondingly prevent and permit movement of the sectionalizer tube means 28 between the closed position of FIG. 1 and open position of FIG. 2.

Figure 16:
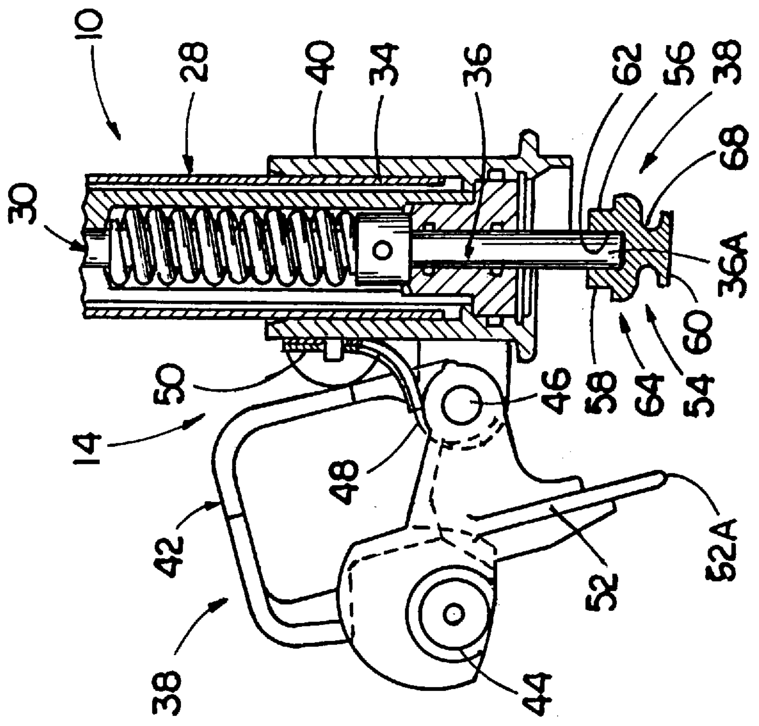
FIG. 16 is an enlarged side elevational view of the pivotal latching mechanism with the latch arm and catch disengaged from one another in the releasing position of FIG. 2.
Figure 15:
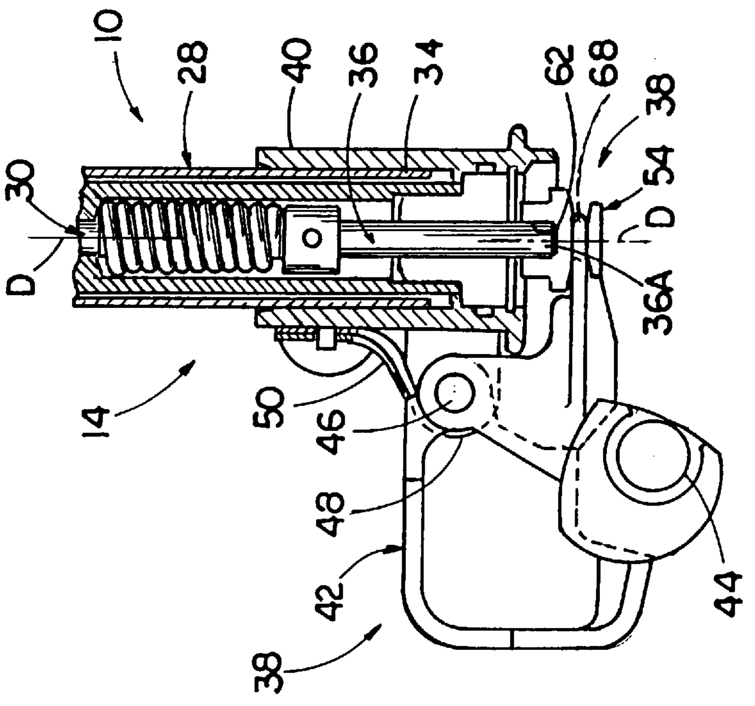
FIG. 15 is an enlarged side elevational view of the pivotal latching mechanism of the present invention with the latch arm and catch interengaged with one another in the latching position of FIG. 1.
Figure 17:
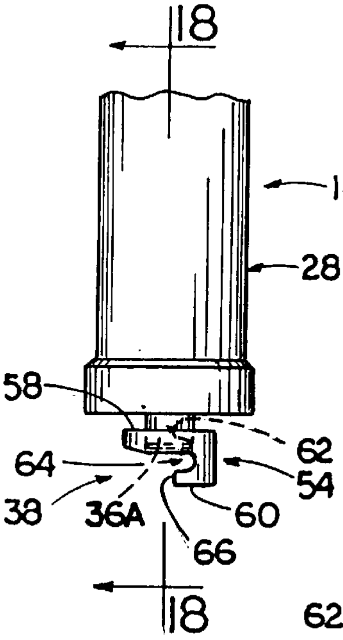
FIG. 17 is a side elevational view of a second embodiment of the catch of the pivotal latching mechanism of the present invention shown mounted on the lower end of an elongated actuating member in the sectionalizer tube means shown in fragmentary form.
Figure 18:
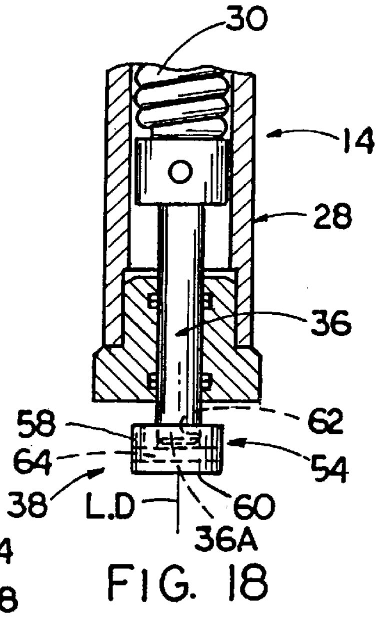
FIG. 18 is a fragmentary longitudinal sectional view of the sectionalizer tube means taken along line 18—18 of FIG. 17 showing an end elevational view of the catch of FIG. 17.
Figure 21:
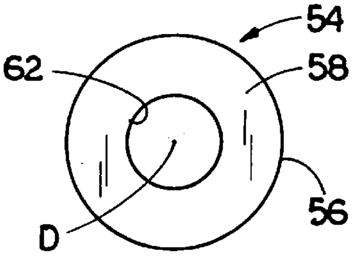
FIG. 21 is a top plan view of the catch as seen along line 21—21 in FIG. 20.
Figure 19:
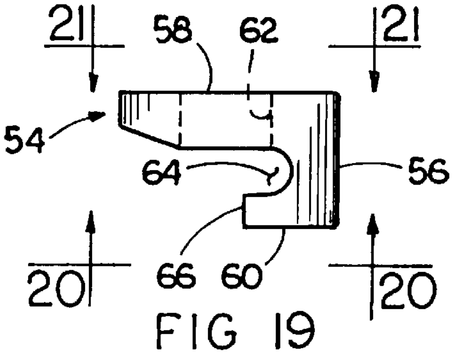
FIG. 19 is an enlarged side elevational view of the catch of FIG. 17.
Figure 20:
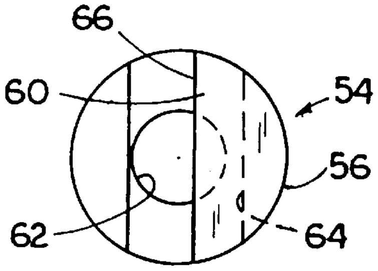
FIG. 20 is a bottom plan view of the catch as seen along line 20—20 in FIG. 19.

The pivotal latching mechanism 38 basically includes pivot member in the form of a trunnion member 42 disposed substantially between the pair of hook-shaped portions 26 of the lower electrical contact 24 and having a pair of cylindrical pins 44 that extend horizontally outwardly in opposite directions and which are received in the respective hook portions 26 of the lower electrical contact 24. The trunnion member 42 is pivotally connected by means of a third cylindrical pin 46 extending between and through a pair of tabs 48 projecting from the lower coupler 40 on the lower end 34 of the sectionalizer tube means 28. A pivotal axis A defined by the third pin 46 extends parallel to a central axis C defined by the pair of pins 44 for enabling pivoting or swinging motion of the trunnion member 42 relative to the sectionalizer tube means 28 during simultaneous swinging movement of the trunnion member 42 relative to the hook portions 26 of the lower electrical contact 24. As best seen in FIGS. 15 and 16, the pivotal latching mechanism 38 also includes a spring contact 50 secured to the lower coupler 40 on the lower end 34 of the sectionalizer tube means 28 which normally engages a portion of the trunnion member 42 located adjacent to the third pivot pin 46 when the sectionalizer tube means 28 is in its current-carrying or closed position, as shown in FIG. 1, for facilitating the flow of current from the upper electrical contact 20 along the length of the sectionalizer tube means 28 and therefrom across the trunnion member 42 to the lower electrical contact 24.

The pivotal latching mechanism 38 also includes a latch arm 52 preferably fixedly attached to and extending from the trunnion member 42 and a catch 54 fitted and carried on the lower end 36A of the elongated actuating member 36. The latch arm 52 undergoes pivotal movement with the trunnion member 42 between the latching and releasing positions. The catch 54 undergoes axial movement with the actuating member 36 between the inner non-actuated and outer actuated positions. The latch arm 52 and catch 54 are interengaged with one another when the pivotal latching mechanism 38 is in the latching position relative to the sectionalizer tube means 28, as shown in FIG. 15, whereas the latch arm 52 and catch 54 are disengaged from one another when the pivotal latching mechanism 38 is in the releasing position relative to the sectionalizer tube means 28, as shown in FIG. 16. The resettable actuating mechanism 30 operates in conjunction with the pivot latching mechanism 38 such that, once the actuating mechanism 30 is "fired" in a known manner, the lower end 36A of the elongated actuating member 36 moves outwardly from the inner non-actuated position of FIG. 15 to the outer actuated position of FIG. 16 and via the catch 54 causes the latch arm 52 of the trunnion member 42 of the pivotal latching mechanism 38 to swing away and disengage from the catch 54 so as to permit the sectionalizer tube means 28 to pivotally shift downwardly and away from the upper electrical contact 20 to open the lateral line. The force exerted by the elongated actuating member 36 does not directly impart movement of the sectionalizer tube means 28 toward an isolating position, but merely moves and actuates the pivotal latching mechanism 38 so that either an over-centering spring or the force of gravity is subsequently operable to urge the sectionalizer tube means 28 to fall away from the upper electrical contact 20, thereby opening the circuit and preventing the flow of current through the electronic sectionalizer 14. The elongated actuating member 36, once "fired", thus immediately swings the trunnion member 42 about the third pin 46 and simultaneously causes the trunnion member 42 to swing relative to the hook portions 26 of the lower electrical contact 24, as shown particularly in FIG. 2, thereby resulting in the sectionalizer tube means 28 shifting downwardly away from the upper electrical contact 20 toward the open position. All of the force exerted by the actuating mechanism 30 is directed toward the latch arm 52 of the trunnion member 42 via the actuating member 36 and catch 54, causing the latch arm 52 and trunnion member 42 to pivotally move away from the sectionalizer tube means 28. The pivotal movement of the trunnion member 42 downwardly away from the sectionalizer tube means 28 causes instantaneous downward movement of the sectionalizer tube means 28 away from the upper electrical contact 20 with a force (assisted by gravity or otherwise) that is sufficient to cause shifting of the sectionalizer tube means 28 to the drop-out open position of FIG. 2.

More particularly, referring to FIGS. 5 to 9, 15 and 16, an outer end 52A of the latch arm 52 on the trunnion member 42 preferably, but not necessarily, has a bifurcated configuration. Referring to FIGS. 10 to 12 and 15 to 20, the catch 54 is in the form of a body 56 having spaced apart upper and lower end portions 58, 60, an aperture 62 defined in the upper end portion 58 which allows snug fitting of the catch 54 to the lower end 36A of the elongated actuating member 36, and a recess 64 defined in at least one side portion 66 of the body 56 extending between the upper and lower end portions 58, 60 thereof. The aperture 62 defines a central axis D of the body 54 which is coincident with the longitudinal axis L of the elongated actuating member 36.

In a preferred embodiment of the catch 54 shown in FIGS. 10 to 12, 15 and 16, the body 56 is substantially symmetrical about the central axis D and the recess 64 is in the form of an annular groove 68 formed in a circumferential continuous sidewall of the body 56 extending symmetrically about the central axis D such that the outer end 52A of the latch arm 52 will partially surround and interengage with the catch 54 within the annular groove 68 at any rotational position of the catch 52 and the actuating member 36 about the longitudinal axis L. In an alternative embodiment of the catch 54 shown in FIGS. 17 to 20, the body 56 is asymmetrical with respect to the central axis D and the recess 64 is formed in only the one side portion 66 of the body 56 also in an asymmetrical relationship to the longitudinal axis L of the actuating member 36 such that the recess 64 must be correctly aligned with the outer end 52A of the latch arm 52 before interengaging the latch arm 52 with the catch 54. Also in the alternative embodiment of the catch 54, it can be seen that the recess 64 intersects the longitudinal axis L of the actuating member 36, whereas in the preferred embodiment of the catch 54, the annular groove 68 surrounds but does not intersect the longitudinal axis L of the actuating member 36.

In summary, with respect to either embodiment, the recess 64 of the catch 54 is open at least at one side portion 66 of the catch 54. The outer end 52A of the latch arm 52 is releasably fittable with the catch 54 within the recess 64 thereof such that the outer end 52A of the latch arm 52 interengages with the catch 54 within the recess 64 thereof and thereby maintains the trunnion member 42 in the latching position when the elongated actuating member 36 is at the inner non-actuated position and the trunnion member 42 is at the latching position, whereas the outer end 52A of the latch arm 52 disengages from the recess 64 of the catch 54 as the actuating member 36 and catch 54 therewith are moved from the inner non-actuated position to the outer actuated position and the trunnion member 42 is thereby moved from the latching position to the releasing position. The movement of the catch 54 with the actuating member 36 from the inner non-actuated position to the outer actuated position causes the outer end 52A of the latch arm 52 and the trunnion member 42 therewith to pivotally move away from and disengage the catch 54, thereby permitting the upper end

32 of the sectionalizer tube means 28 to move from the closed position to the open position relative to the upper electrical contact 20.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A sectionalizer assembly, comprising:

(a) a mounting structure having spaced apart upper and lower electrical contacts;

(b) a sectionalizer tube means having spaced apart upper and lower ends;

(c) an actuating member mounted to said sectionalizer tube means and having a lower end movable from a non-actuated position to an actuated position relative to said lower end of said sectionalizer tube means; and (d) a pivotal latching mechanism disposed between said lower electrical contact and said lower end of said sectionalizer tube means, said pivotal latching mechanism including (I) a pivot member mounted to said lower electrical contact and to said lower end of said sectionalizer tube means for undergoing pivotal movement relative thereto between latching and releasing positions, (ii) a latch arm attached to said pivot member and extending outwardly therefrom for undergoing pivotal movement therewith between said latching and releasing positions, said latch arm having an outer end, and (iii) a catch carried on said lower end of said actuating member for undergoing movement therewith, said catch having a recess defined therein, said outer end of said latch arm being releasably fittable with said catch within said recess thereof such that said outer end of said latch arm interengages said catch within said recess thereof and thereby maintains said pivot member in said latching position when said actuating member is at said non-actuated position and said pivot member is at said latching position whereas said outer end of said latch arm disengages said recess of said catch as said actuating member is moved from said non-actuated position to said actuated position and said pivot member is thereby moved from said latching position to said releasing position, said movement of said catch with said actuating member from said non-actuated position to said actuated position causing said outer end of said latch arm to pivotally move with said pivot member away from and disengage said catch, thereby permitting said upper end of said sectionalizer tube to move from a closed position to an open position relative to said upper electrical contact.

2. The assembly as recited in claim 1, wherein said recess of said catch is defined therein and open at least at one side portion of said catch.

3. The assembly as recited in claim 2, wherein said catch is a body having spaced apart upper and lower end portions, said recess being defined in at least said one side portion of said catch extending between said upper and lower end portions thereof.

4. The assembly as recited in claim 3, wherein said catch has an aperture defined in said upper end portion of said body fitting said catch to said end of said elongated actuating member.

5. The assembly as recited in claim 2, wherein said body is substantially symmetrical about a central axis of said body that is coincident with a longitudinal axis of said actuating member.

6. The assembly as recited in claim 5, wherein said recess is an annular groove formed in a circumferential sidewall of said body and extending symmetrically about said central axis thereof and said longitudinal axis of said actuating member such that said outer end of said latch arm will interengage within said annular groove at any angular position of said catch and actuating member about said longitudinal axis.

7. The assembly as recited in claim 6, wherein said annular groove surrounds but does not intersect said longitudinal axis of the actuating member.

8. The assembly as recited in claim 6, wherein said latch arm has an outer end with a bifurcated configuration adapted to at least partially surround and interfit with said body of said catch within said annular groove thereof.

9. The assembly as recited in claim 3, wherein said body is in an asymmetrical relationship to said longitudinal axis of said actuating member such that said recess must be correctly aligned with said outer end of said latch arm before interengaging said latch arm with said catch, said recess intersecting said longitudinal axis of said actuating member.

* * * * *